(12) United States Patent
Kimura et al.

(10) Patent No.: US 6,449,971 B1
(45) Date of Patent: Sep. 17, 2002

(54) AIR-CONDITIONING SYSTEM (75) Inventors: Kazuya Kimura; Tatsuya Hirose; Masaki Ota; Masahiro Kawaguchi; Naoya Yokomachi, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/723,507

(22) Filed: Nov. 28, 2000

(30) Foreign Application Priority Data

Dec. 27, 1999 (JP) .......................................... 11-369694

(51) Int. Cl.[7] .............................. F25B 1/00; F25B 13/00
(52) U.S. Cl. ...................... 62/228.3; 62/160; 417/222.2
(58) Field of Search ................................. 62/160, 228.3, 62/228.5; 417/222.2

(56) References Cited

U.S. PATENT DOCUMENTS

| 5,086,634 A | * | 2/1992 | Matsuoka et al. ............ 62/160 |
| 5,094,589 A | | 3/1992 | Terauchi et al. ......... 417/222 S |
| 5,531,572 A | | 7/1996 | Kimura et al. ............ 417/222.2 |
| 5,567,124 A | | 10/1996 | Takenaka et al. ........ 417/222.2 |
| 5,689,960 A | * | 11/1997 | Bearint ...................... 62/228.3 |

FOREIGN PATENT DOCUMENTS

| EP | 0 536 989 A1 | 4/1993 | |
| EP | 1 014 016 A2 | 6/2000 | |
| JP | 4 061 801 55 | * 6/1994 | ............... 62/228.3 |
| JP | P 7-19630 | 1/1995 | |
| JP | 09 166086 | 6/1997 | |
| JP | P 11-180138 | 7/1999 | |

OTHER PUBLICATIONS

EP 00 12 5459 Search Report dated Apr. 17, 2001.

* cited by examiner

Primary Examiner—William Wayner
(74) Attorney, Agent, or Firm—Woodcock Washburn LLP (57) ABSTRACT

An air-conditioning system capable of always effectively performing the heating function by selectively using one of a cooling circuit and a heating circuit sharing a variable displacement type compressor is disclosed. An electromagnetic capacity control valve (43) controls the discharge capacity of a variable displacement type compressor (25) in response to the differential pressure between the discharge pressure Pd of a discharge chamber (132) and the suction pressure Ps of a suction chamber (131). The energization and deenergization of the capacity control valve (43) is controlled by a control unit (59). When a cooling command switch (63) is turned on, the control unit (59) deenergizes a switching valve (29) thereby to control the cooling operation while at the same time controlling the discharge capacity by the capacity control valve (43). When a heating command switch (64) is turned on, on the other hand, the control unit (59) energizes the switching valve (29) thereby to control the heating operation while at the same time controlling the discharge capacity by the capacity control valve (43).

6 Claims, 8 Drawing Sheets

AIR-CONDITIONING SYSTEM

BACKGROUND OF THE INVENTION

1. Field of the Invention

The present invention relates to an air-conditioning system comprising a variable displacement type compressor for compressing and discharging a refrigerant while at the same time changing the discharge capacity by changing a control pressure, and a cooling circuit and a heating circuit sharing the use of the variable displacement type compressor, in which the cooling circuit or the heating circuit is selectively used.

2. Description of the Related Art

An air-conditioning system of this type is disclosed in Japanese Unexamined Patent Publication (Kokai) No. 7-19630. When the cooling circuit is used, the refrigerant discharged from the compressor recirculates to the compressor through a condenser, an expansion valve and an evaporator. When the heating circuit is in use, on the other hand, the refrigerant discharged from the compressor recirculates to the compressor through an evaporator and a pressure reducing device on a first bypass. The operation of the cooling circuit and the heating circuit is switched by operating a switching valve.

When the heating circuit is used, the condenser is isolated, and therefore the discharge pressure is determined by the balance between the discharge amount of the compressor and the flow rate in the pressure reducing device on the bypass. As a result, the discharge pressure of the compressor is liable to be higher when the heating circuit is in use than when the cooling circuit is in use. Thus, when the heating circuit is in use, the discharge pressure often rises to an abnormally high level. In view of this, the conventional system disclosed in Kokai No. 7-19630 comprises a pressure relief valve interposed on a second bypass connecting the cooling circuit and the heating circuit. In the case where the discharge pressure rises to an abnormally high level while the heating circuit is being used, the pressure relief valve is opened to release the refrigerant from the heating circuit into the condenser.

Since the refrigerant is released into the condenser from the heating circuit each time the discharge pressure rises to an abnormally high level when the heating circuit is used, however, the refrigerant in the heating circuit is reduced in amount to such an extent that the heating capacity becomes insufficient. Also, the refrigerant is released wastefully to the condenser at the sacrifice of the work required on the part of the compressor to increase the pressure, thereby leading to a low energy efficiency.

In the case where a variable displacement type compressor disclosed in Kokai No. 11-180138, i.e. in the case where a variable displacement type compressor with an adjustable suction pressure setting is used as a compressor shared by the cooling circuit and the heating circuit, the situation may occur in which the air-conditioning system cannot perform the heating function. Specifically, the capacity control valve used with the variable displacement type compressor disclosed in Kokai No. 11-180138 functions to reduce the discharge capacity to such an extent as to reduce the pressure setting described above. Once the atmospheric temperature drops to such a level that the saturated pressure of the refrigerant drops below the range of the pressure setting, therefore, the discharge capacity cannot be increased and the air-conditioning system cannot perform the heating function.

SUMMARY OF THE INVENTION

The object of this invention is to provide an air-conditioning system comprising a variable displacement type compressor, and a cooling circuit and a heating circuit selectively sharing the variable displacement type compressor, in which the heating function is always effectively and efficiently performed on the one hand and a reduction in the cooling and heating functions is avoided on the other hand.

According to the invention, there is provided an air-conditioning system comprising a variable displacement type compressor for compressing and discharging the refrigerant while at the same time changing the discharge capacity by changing the control pressure, a cooling circuit and a heating circuit selectively sharing the use of the variable displacement type compressor, and capacity control means for controlling the discharge capacity of the variable displacement type compressor based on the differential pressure between the pressure in the discharge pressure area and the pressure in the suction pressure area or between the pressure in the discharge pressure area and the control pressure, wherein the capacity control means controls both the discharge capacity for circulating the refrigerant in the cooling circuit and the discharge capacity for circulating the refrigerant in the heating circuit.

By controlling the discharge capacity based on the differential pressure between the pressure in the discharge pressure area and the suction pressure area or between the pressure in the discharge pressure area and the control pressure, the discharge capacity can be controlled upward and therefore the air-conditioning system can perform the heating function even when the temperature is very low.

The present invention may be more fully understood from the description of a preferred embodiment set forth below, together with the accompanying drawings.

DESCRIPTION OF THE PREFERRED EMBODIMENTS

An air-conditioning system mounted on an automotive vehicle according to a first embodiment of the invention will be explained below with reference to FIGS. 1 to 5.

Figure 1:
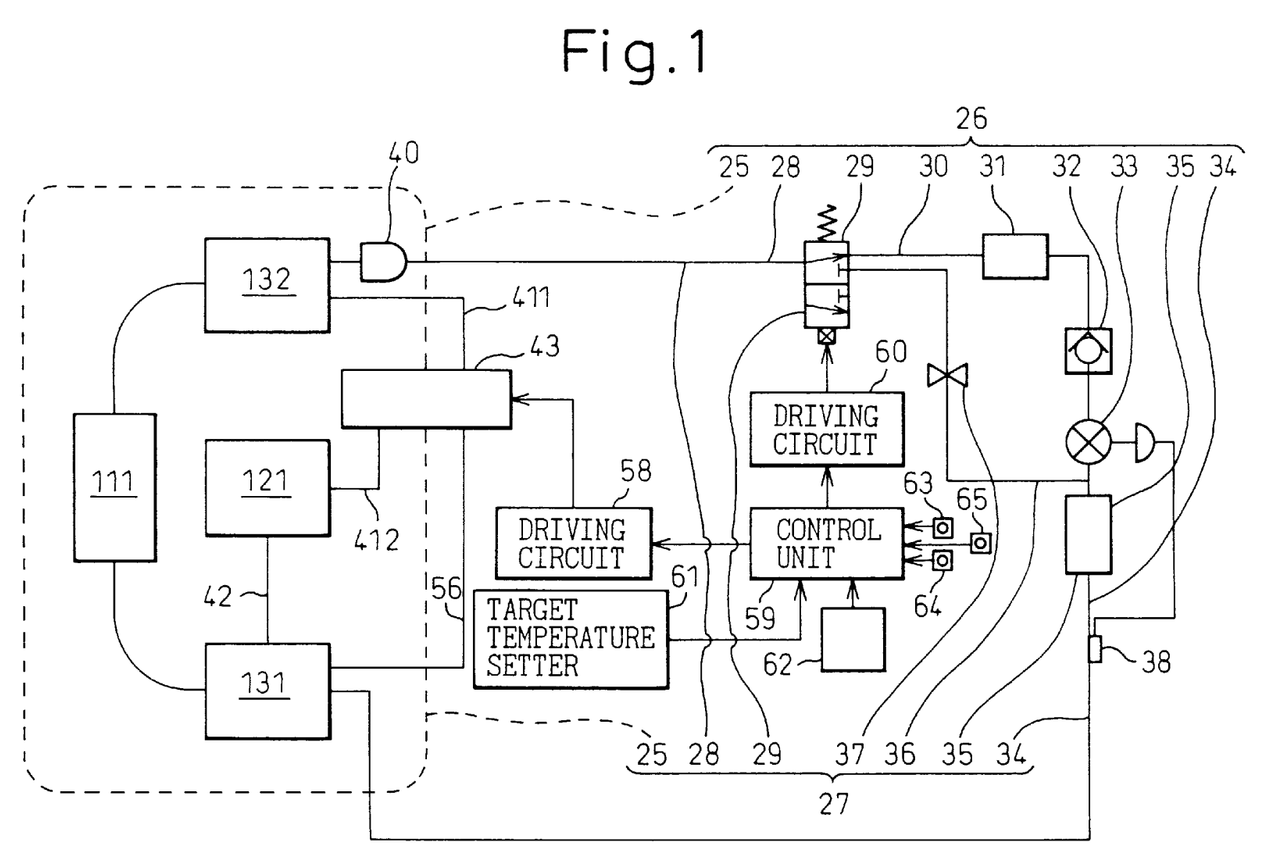
FIG. 1 is a circuit diagram showing a cooling circuit and a heating circuit according to a first embodiment of the invention.
Figure 3:
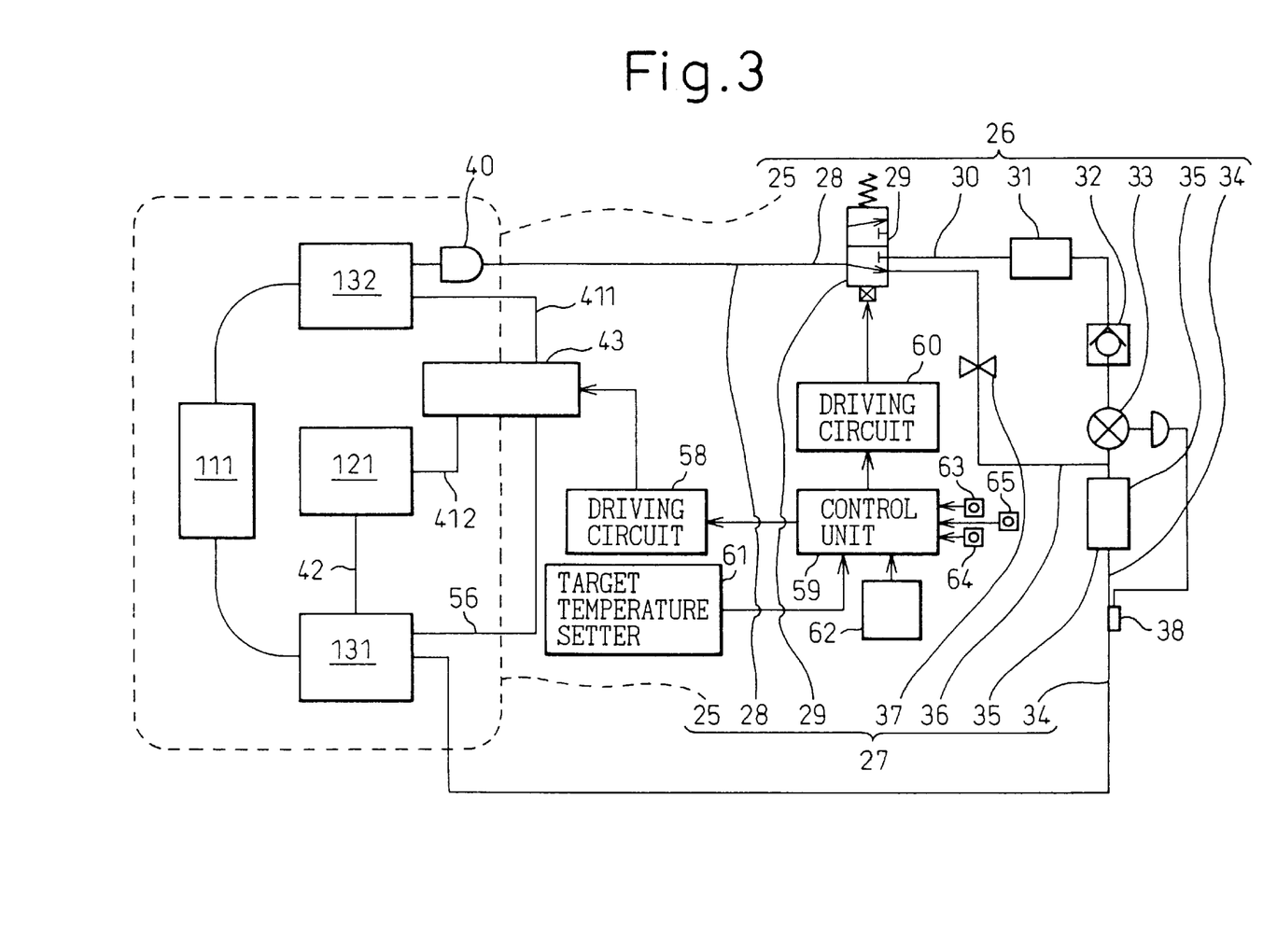
FIG. 3 is a circuit diagram showing a cooling circuit and a heating circuit.

FIGS. 1 and 3 show a cooling circuit 26 and a heating circuit 27 sharing the use of a variable displacement type compressor 25. The cooling circuit 26 includes the variable displacement type compressor 25, a flow passage 28, an electromagnetic three-way switching valve 29, a flow passage 30, a condenser 31, a check valve 32, an expansion valve 33, a flow passage 34 and an evaporator 35. The heating circuit 31 includes the variable displacement type compressor 25, the flow passage 28, the switching valve 29, a flow passage 36, a throttle 37, a flow passage 34 and the evaporator 35. A temperature-sensing cylinder 38 is arranged on the outlet side of the evaporator 35. The temperature-sensing cylinder 38 transmits the pressure corresponding to the temperature on the outlet side of the evaporator 35 to the expansion valve 33. The valve opening degree of the expansion valve 33 is controlled based on the pressure transmitted from the temperature-sensing cylinder 38 in accordance with the temperature on the outlet side of the evaporator 35.

In the case where the switching valve 29 is in a first switched state shown in FIG. 1, the refrigerant discharged from the variable displacement type compressor 25 is recirculated to the variable displacement type compressor 25 through the switching vale 29, the condenser 31, the check valve 32, the expansion valve 33 and the evaporator 35. In the case where the refrigerant circulates in the cooling circuit 26 in this way, the heat exchange operation is performed in the evaporator 35 to cool the compartments of the vehicle. In the case where the switching valve 29 is set to a second switched state shown in FIG. 3, on the other hand, the refrigerant discharged from the variable displacement type compressor 25 recirculates to the variable displacement type compressor 25 through the switching valve 29, the throttle 37 and the evaporator 35. In the case where the refrigerant circulates in the heating circuit 27 in this way, the high-temperature refrigerant discharged from the variable displacement type compressor 25 is sent directly to the evaporator 35 where the heat exchange operation is performed to heat the compartments of the vehicle.

Figure 2:
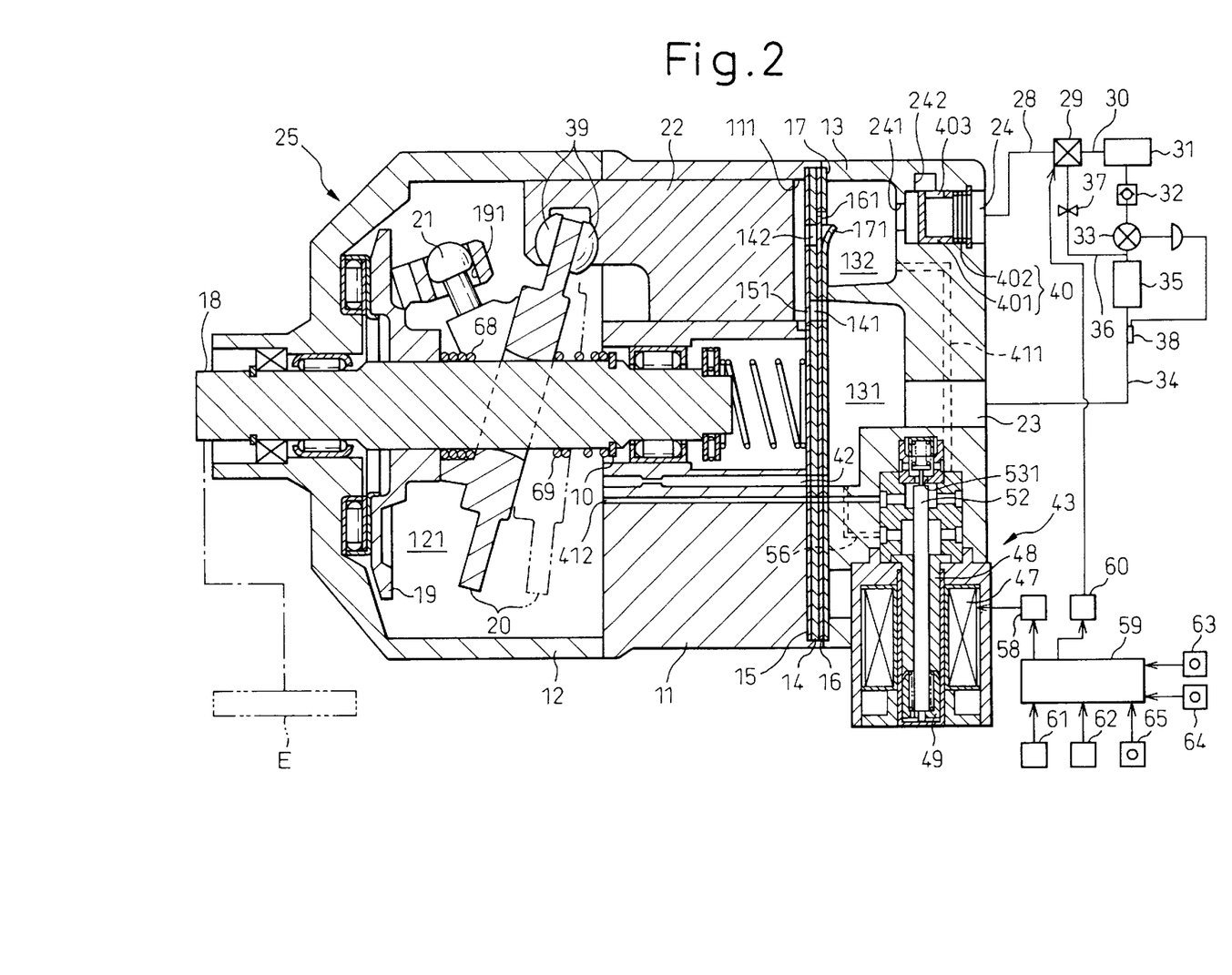
FIG. 2 is a side sectional view of a variable displacement type compressor.

FIG. 2 shows an internal structure of the variable displacement type compressor 25. A rotary shaft 18 is supported on a front housing 12 and a cylinder block 11 forming a control pressure chamber 121. The rotary shaft 18 acquires the rotary drive force directly from a vehicle engine E without the use of a clutch. A rotary support member 19 is securely fixed on the rotary shaft 18. Also, a swash plate 20 is slidably and inclinably supported along the axis of the rotary shaft 18. A guide pin 21 fixed on the swash plate 20 is slidably fitted in a guide hole 191 formed in the rotary support member 19. The swash plate 20 can be rotated inclinably along the axis of the rotary shaft 18 and integrally with the rotary shaft 18 by the collaboration between the guide hole 191 and the guide pin 21. The inclination of the swash plate 20 is guided by the sliding relation between the guide hole 191 and the guide pin 21 and the slide supporting function of the rotary shaft 18.

An inclination angle reducing spring 68 and a capacity restoration spring 69 are arranged before and after the swash plate 20. The inclination angle reducing spring 68 is arranged between the rotary support member 19 and the swash plate 20, while the capacity restoration spring 69 is arranged between the swash plate 20 and a snap ring 10 on the rotary shaft 18.

In the cylinder block 11, a plurality of cylinder bores 111 (only one is shown in the drawing) are arranged around the rotary shaft 18. Each cylinder bore 111 encases a piston 22. The rotational motion of the swash plate 20 rotated integrally with the rotary shaft 18 is converted into the longitudinal reciprocating motion of the piston 22 through a shoe 39 so that the piston 22 moves longitudinally in the cylinder bore 111. A suction chamber 131 and a discharge chamber 132 are defined in a rear housing 13. As the result of the backward movement (movement from right to left in FIG. 2) of the piston 22, the refrigerant in the suction chamber 131 making up the suction pressure area flows into the cylinder bore 111 by forcing out the suction valve 151 above a valve forming plate 15 from a suction port 141 above a valve plate 14. The refrigerant that has flowed into the cylinder bore 111 is discharged into the discharge chamber 132 making up the discharge pressure area by forcing out a discharge valve 161 above a valve-forming plate 16 from a discharge port 142 above the valve plate 14 as the result of the forward movement (movement from left to right in FIG. 2) of the piston 22. The opening degree of the discharge valve 161 is restricted as the discharge valve 161 comes into contact with a retainer 171 on a retainer-forming plate 17. The discharge chamber 132 is connected to the flow passage 28 through a discharge passage 24, while the suction chamber 131 is connected to the flow passage 34 through a suction passage 23.

A discharge operation valve 40 is interposed in the discharge passage 24. The cylindrical valve body 401 of the discharge operation valve 40 is urged by a compression spring 402 in a direction to close a valve hole 241 and thus acts as a check valve. When the valve body 401 is located at the position shown in FIG. 2, the refrigerant in the discharge chamber 132 flows out into the flow passage 28 through the valve hole 241, a bypass 242, a through hole 403 and the interior of the cylinder of the valve body 401. When the valve hole 241 of the valve body 401 is closed, the refrigerant in the discharge chamber 132 does not flow out into the flow passage 28.

The refrigerant in the discharge chamber 132 is sent to the control pressure chamber 121 by way of pressure supply passages 411, 412 connecting the discharge chamber 132 and the control pressure chamber 121. The refrigerant in the control pressure chamber 121 flows out into the suction chamber 131 through a pressure release passage 42 connecting the control pressure chamber 121 and the suction chamber 131.

Figure 4:
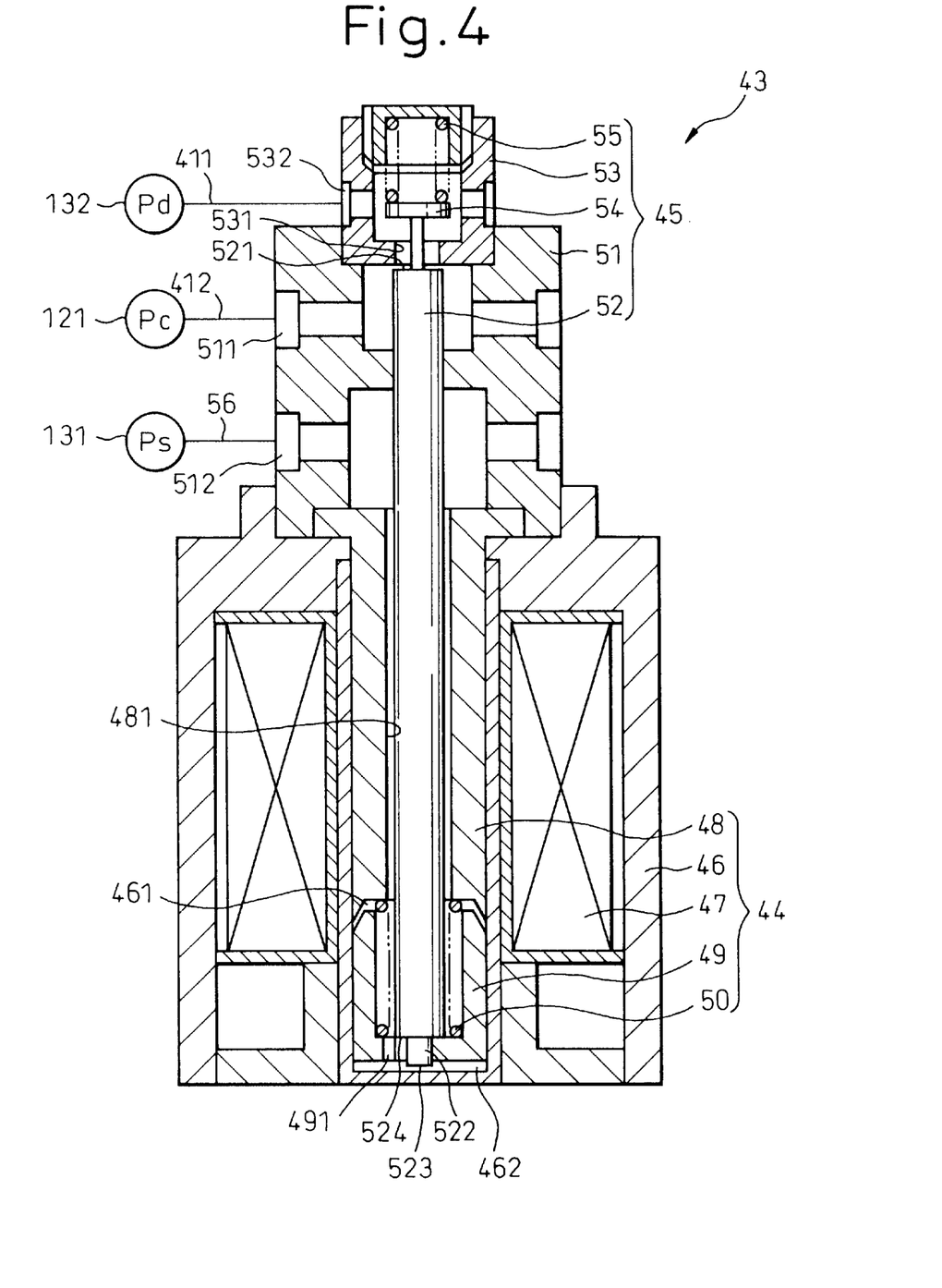
FIG. 4 is a sectional view of a capacity control valve 43.

An electromagnetic capacity control valve 43 is interposed between the pressure supply passages 411, 412. FIG. 4 shows the internal structure of the capacity control valve 43. The capacity control valve 43 includes a solenoid portion 44 and a valve portion 45. The solenoid portion 44 includes a housing 46, a coil 47 encased in the housing 46, a cylindrical fixed iron core 48, a cylindrical movable iron core 49 and a compression spring 50 for urging the movable iron core 49 in a direction away from the fixed iron core 48. The movable iron core 49 forms and defines a pressure sensitive chamber 462 on the opposite side of an accommodation chamber 461 for the compression spring 50. When current is supplied to the coil 47, the electromagnetic force is generated to urge the movable iron core 49 toward the fixed iron core 48. The valve portion 45 includes a housing 51, a rod-like valve body 52 encased in the housing 51, a refrigerant lead-in cylinder 53 fixed on the housing 51 and a compression spring 55 for urging the valve body 52 through a spring seat 54 in a direction away from the refrigerant lead-in cylinder 53.

The refrigerant lead-in cylinder 53 is formed with a valve hole 531 which is opened and closed by the valve body 52. The refrigerant lead-in cylinder 53 is also formed with a lead-in passage 532. The lead-in passage 532 communicates with the valve hole 531. The discharge chamber 132 communicates with the valve hole 531 through the pressure supply passage 411 and the lead-in passage 532. Specifically, the pressure (discharge pressure) in the discharge chamber 132 is imparted to the valve hole 531, so that the valve body 52 is urged in a direction to open the valve hole 531 by the pressure in the neighborhood of the valve hole 531. The neighborhood of the end surface 521 of the valve body 52 is environed by an ambience substantially corresponding to the discharge pressure (hereinafter referred to as Pd), and the discharge pressure Pd is applied to the end surface 521. The housing 51 is formed with a lead-out passage 511, which is connected with the valve hole 531. The control pressure chamber 121 is connected to the valve hole 531 through the pressure supply passage 412 and the lead-out passage 511.

The housing 51 is formed with a pressure lead-in passage 512. The pressure lead-in passage 512 communicates with a pressure sensitive chamber 462 through an insertion hole 481 in the cylinder of the fixed iron core 48, an accommodation chamber 461 and a through hole 491 formed in the movable iron core 49. The suction chamber 131 communicates with the pressure sensitive chamber 461 through the passage 56 (shown in FIG. 2), the pressure lead-in passage 512, the insertion hole 481 in the cylinder of the fixed iron core 48, an accommodation chamber 461 and a through hole 491. Specifically, the pressure (suction pressure) in the suction chamber 131 is imparted to the pressure sensitive chamber 462. The rod-like valve body 52 reaches the movable iron core 49 through the insertion hole 481 in the cylinder of the fixed iron core 48. The small diameter portion 522 at the lower end of the valve body 52 protrudes into the pressure sensitive chamber 462 through the movable iron core 49. The suction pressure (hereinafter designated as Ps) in the pressure sensitive chamber 462 urges the valve body 52 in a direction to close the valve hole 531.

The discharge pressure Pd imparted to the end surface 521 of the valve body 52 and the suction pressure Ps imparted to the end surface 523 of the valve body 52 and the step 524 of the valve body 52 are opposed to each other through the valve body 52. The sum of the area of the end surface 523 of the small diameter portion 522 and the area of the step 524 is equal to the area of the end surface 521. Thus, the differential pressure ΔPds between the discharge pressure Pd and the suction pressure Ps opposed to each other through the valve body 52 is substantially given as (area of end surface 521)×(Pd−Ps). The discharge pressure Pd is larger than the suction pressure Ps and therefore the differential pressure ΔPds urges the valve body 52 in a direction to open the valve hole 531. The electromagnetic force generated by energizing the coil 47, i.e. by excitation of the solenoid portion 44, is opposed to the force of the sum of the differential pressure ΔPds and the spring force of the compression springs 50, 55. The solenoid portion 44 constitutes means for applying the driving force for defining the differential pressure, by which the driving force is applied to the valve body 52 to oppose the differential pressure ΔPds.

As shown in FIG. 2, the energization and deenergization of the capacity control valve 43 is controlled by the control unit 59 through the driving circuit 58. The capacity control valve 43 and the control unit 59 make up capacity control means. The coil 47 is energized by being supplied with a pulse-like driving current having the duty factor thereof controlled. The electromagnetic driving force is determined by the duty factor in such a manner that the larger the duty factor, the larger the electromagnetic driving force.

With the increase in the duty factor, the electromagnetic driving force is increased thereby to reduce the valve opening degree of the capacity control valve 43. With the reduction in valve opening degree, a lesser amount of the refrigerant is supplied from the discharge chamber 132 to the control pressure chamber 121. Since the refrigerant in the control pressure chamber 121 flows out into the suction chamber 131 through the pressure release passage 42, the pressure in the control pressure chamber 121 (hereinafter referred to as the control pressure Pc) drops. Thus, the inclination angle of the swash plate 20 increases for a larger discharge capacity. The expansion valve 33 for reducing the pressure is arranged on the flow passage 30, and the throttle 37 for reducing the pressure is arranged on the flow passage 36. As a result, an increased discharge capacity increases the discharge pressure Pd for a higher differential pressure ΔPds. A reduced duty factor decreases the electromagnetic driving force for an increased valve opening degree of the capacity control valve 43. With the increase in valve opening degree, an increased amount of the refrigerant is supplied from the discharge chamber 132 to the control pressure chamber 121 thereby to increase the control pressure Pc in the control pressure chamber 121. Thus, the inclination angle of the swash plate 20 decreases for a smaller discharge capacity. A decreased discharge capacity lowers the discharge pressure Pd for a lower differential pressure ΔPds. In other words, the capacity control valve 43 autonomously controls the differential pressure ΔPds in accordance with the duty factor.

In the case where the duty factor reaches zero, i.e. when the supply current decreases to zero, the valve opening degree of the capacity control valve 43 becomes maximum while the inclination angle of the swash plate 20 decreases to minimum. When the inclination angle of the swash plate is minimum, the discharge pressure Pd is low. At such a time, the spring force of the compression spring 402 is set so that the pressure upstream of the discharge operation valve 40 in the discharge passage 24 is lower than the sum of the pressure downstream of the discharge operation valve 40 and the spring force of the compression spring 402. Thus, when the inclination angle of the swash plate 20 becomes minimum, the valve body 401 closes the valve hole 241 and the refrigerant circulation in the cooling circuit 26 or the heating circuit 27 stops.

The controlling factor for determining the minimum inclination angle of the swash plate 20 is the balance of the urging force between the inclination angle reducing spring 68 and the capacity restoration spring 69 with a substantially maximum moment due to the control pressure Pc in the direction of decreasing the inclination angle. The refrigerant that has been discharged from the cylinder bore 111 to the discharge chamber 132 flows into the control pressure chamber 121 through the pressure supply passages 411, 412. The refrigerant in the control pressure chamber 121 flows out to the suction chamber 131 through the pressure release passage 42, and the refrigerant in the suction chamber 131 is discharged into the discharge chamber 132 by being sucked into the cylinder bore 111. Specifically, with a minimum inclination angle of the swash plate, a circulation passage is formed in the compressor through the discharge chamber 132 making up the discharge pressure area, the pressure supply passages 411, 412, the control pressure chamber 121, the pressure release passage 42, the suction chamber 131 making up the suction pressure area and the cylinder bore 111. Also, a differential pressure is generated between the discharge chamber 132, the control pressure chamber 121 and the suction chamber 131. Thus, the refrigerant circulates in the circulation passage described above, and a lubricant flowing with the refrigerant circulates in the compressor.

The energization/deenergization of the switching valve 29 is controlled by the control unit 59 through the driving circuit 60. The control unit 59 is electrically connected to a target temperature setter 61 and a room temperature detector 62 by a signal. The room temperature detector 62 detects the temperature in the vehicle compartments. The control unit 59 detects the target temperature To set by the target temperature setter 61 and the detection temperature Tx detected by the room temperature detector 62. Also, the signal of the control unit 59 is connected to a cooling command switch 63, a heating command switch 64 and a stop command switch 65.

Figure 5:
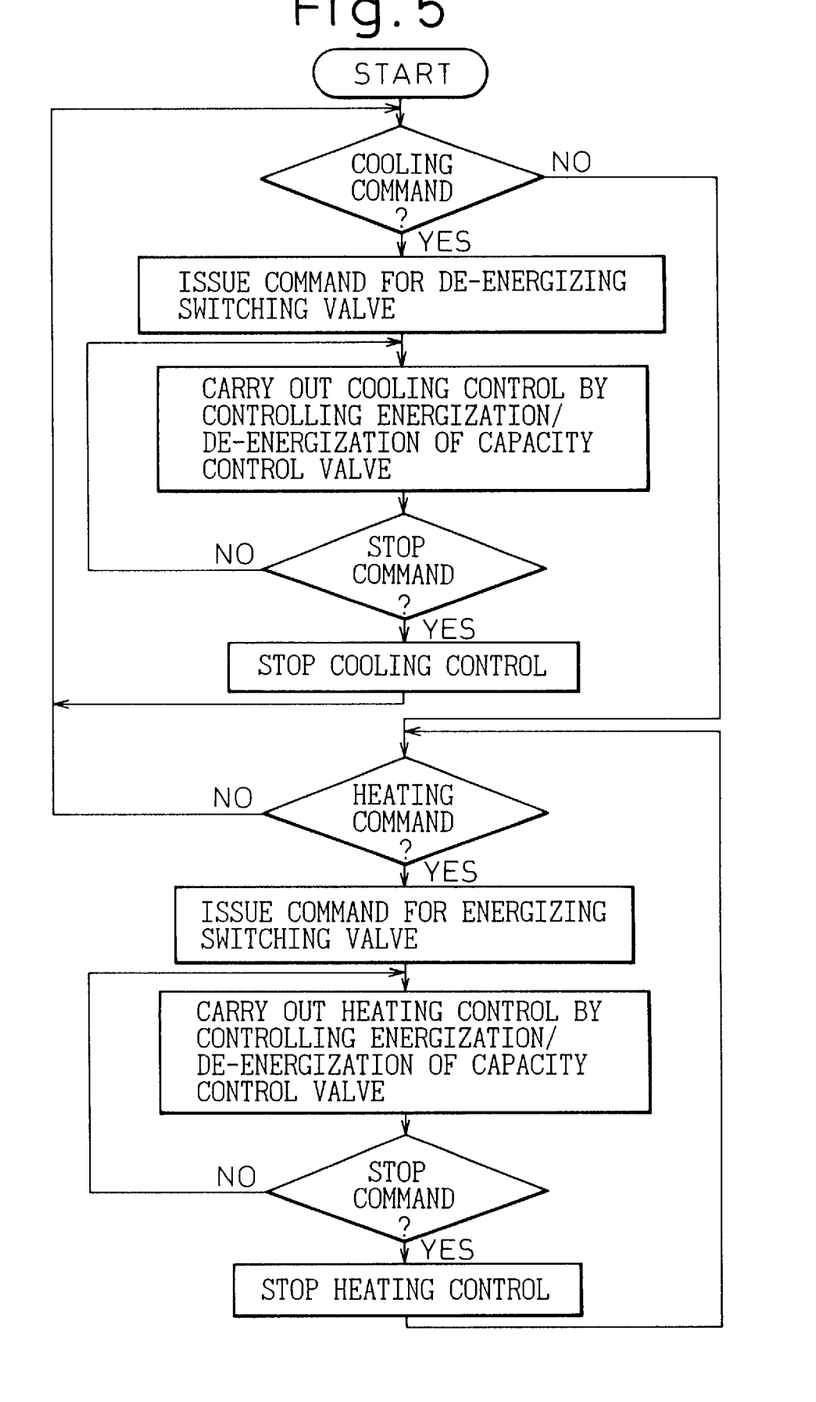
FIG. 5 is a flowchart showing a cooling and heating control program.

The control unit 59 carries out the cooling and heating control program shown in the flowchart of FIG. 5. In this case, the maximum value Rm of the duty factor for generating the differential pressure $\Delta Pdsm$ set to the largest possible level including a margin of the range where the discharge pressure Pd does not increase to abnormally high level is input to and set in the control unit 59.

With the turning on of the cooling command switch 63, the control unit 59 issues a command to deenergize the switching valve 29, so that the switching valve 29 is held in the first switched state shown in FIG. 1. Then, the control unit 59 carries out the cooling control operation based on the energization/deenergization of the capacity control valve 43. The control unit 59 controls the energization and deenergization of the capacity control valve 43 in such a manner as to converge the detection temperature Tx to the target temperature To. In the case where the detection temperature Tx is higher than the target temperature To, the control unit 59 increases the differential pressure $\Delta Pds$ by increasing the duty factor. The increase in the differential pressure $\Delta Pds$ is brought about by the increase in the discharge capacity, and increases the heat exchange amount in the evaporator 35. As a result, the temperature in the vehicle compartments is decreased. In the case where the detection temperature Tx is lower than the target temperature To, on the other hand, the control unit 59 reduces the duty factor to a lower value or zero thereby to reduce the differential pressure $\Delta Pds$. The reduction in the differential pressure $\Delta Pds$ is brought about by the reduction in the discharge capacity and reduces the heat exchange amount in the evaporator 35. As a result, the temperature in the vehicle compartments increases.

When the control unit 59 turns on the stop command switch 65 during the cooling control operation, the energization of the capacity control valve 43 is stopped by the control unit 59 thereby to stop the cooling control operation.

With the turning on of the heating command switch 64, the control unit 59 gives a command to excite the switching valve 29, and the switching valve 29 is held in the second switched state shown in FIG. 3. Then, the control unit 59 carries out the heating control operation by controlling the energization and deenergization of the capacity control vale 43. The control unit 59 controls the energization and deenergization of the capacity control valve 43 while fixing the duty factor at the maximum value Rm. When the differential pressure $\Delta Pds$ exceeds the set differential pressure $\Delta Pdsm$, the valve opening degree of the capacity control valve 43 increases so as to decrease the inclination angle of the swash plate 20. Thus, the discharge capacity decreases and the discharge pressure Pd drops. The decreased discharge pressure Pd reduces the differential pressure $\Delta Pds$ for a smaller valve opening degree of the capacity control valve 43. In the case where the differential pressure $\Delta Pds$ decreases to below the differential pressure $\Delta Pdsm$, on the other hand, the valve opening degree of the capacity control valve 43 decreases while the inclination angle of the swash plate 20 increases. As a result, the discharge capacity increases for an increased discharge pressure Pd. The increase in the discharge pressure Pd brings about an increased differential pressure $\Delta Pds$ and increases the valve opening degree of the capacity control valve 43. In other words, the capacity control valve 43 autonomously controls the valve opening degree in such a manner as to converge the differential pressure $\Delta Pds$ to the differential pressure $\Delta Pdsm$.

When the stop command switch 65 is turned on by the control unit 59 during the execution of the heating control operation, the control unit 59 stops the heating control operation by deenergizing the capacity control valve 43.

The control unit 59 for performing the cooling and heating control operation described above constitutes driving force control means for controlling the driving force of the means which applies the driving force for defining the differential pressure, based on the information for defining the differential pressure such as the detection temperature Tx and the target temperature To.

The following effects are produced by the first embodiment.

(1) The capacity control valve 43 which, together with the control unit 59, constitutes the capacity control means controls the discharge capacity of the variable displacement type compressor 25 in response to the differential pressure $\Delta Pds$ between the discharge pressure Pd and the suction pressure Ps. Both when using the cooling circuit 26, i.e. when circulating the refrigerant in the cooling circuit 26, and when using the heating circuit 27, i.e. when circulating the refrigerant in the heating circuit 27, the discharge capacity is controlled by the capacity control valve 43 responsive to the differential pressure. In controlling the discharge capacity based on the differential pressure $\Delta Pds$ between the discharge pressure Pd in the discharge chamber 132 constituting the discharge pressure area and the suction pressure Ps in the suction chamber 131 making up the suction pressure area, the suction pressure Ps is not controlled unlike when controlling the discharge capacity by controlling the suction pressure Ps as disclosed in Kokai No. 11-180138. In controlling the discharge capacity by controlling the suction pressure Ps, assuming that the atmospheric temperature drops to such an extent that the saturated pressure of the refrigerant decreases below the range of a set suction pressure, the discharge capacity cannot be increased, thereby making it impossible for the air-conditioning system to perform the heating function. By controlling the discharge capacity based on the differential pressure $\Delta Pds$ between the discharge pressure Pd and the suction pressure Ps, on the other hand, the control operation becomes possible to increase the discharge capacity even at a very low temperature. Thus, the air-conditioning system according to this embodiment can positively accomplish the heating function even at a very low temperature.

(2) The capacity control valve 43 functions in such a manner as to reduce the discharge capacity in the case where the a preset differential pressure $\Delta Pdsm$ is exceeded by the differential pressure $\Delta Pds$ between the discharge pressure Pd and the suction pressure Ps. The suction pressure Ps undergoes a lesser change than the discharge pressure Pd. As far as the differential pressure $\Delta Pdsm$ is properly set as described above, therefore, the preset differential pressure $\Delta Pdsm$ is not rarely exceeded to a large measure by the differential pressure $\Delta Ps$ between the discharge pressure Pd and the suction pressure Ps, thereby preventing the abnormal increase of the discharge pressure Pds. According to this embodiment, the discharge capacity is controlled to prevent the abnormal rise of the discharge pressure Pd regardless of whether the cooling circuit or the heating circuit 27 is in use.

(3) The refrigerant is circulated only in the cooling circuit 26 when in the cooling control operation, and only in the heating circuit 27 when in the heating control operation. In other words, the refrigerant increased to high pressure by the work of the variable displacement type compressor 25 is not wastefully released to the circuit not in use, thus preventing the deterioration in the cooling and heating functions which otherwise might be caused by a reduced energy efficiency.

(4) Regardless of whether the cooling circuit 26 or the heating circuit 27 is used, the configuration for controlling the discharge capacity by a single capacity control valve 43 both simplifies the mechanism of the variable displacement type compressor 25 and avoids making the variable displacement type compressor 25 bulky at the same time.

Figure 6:
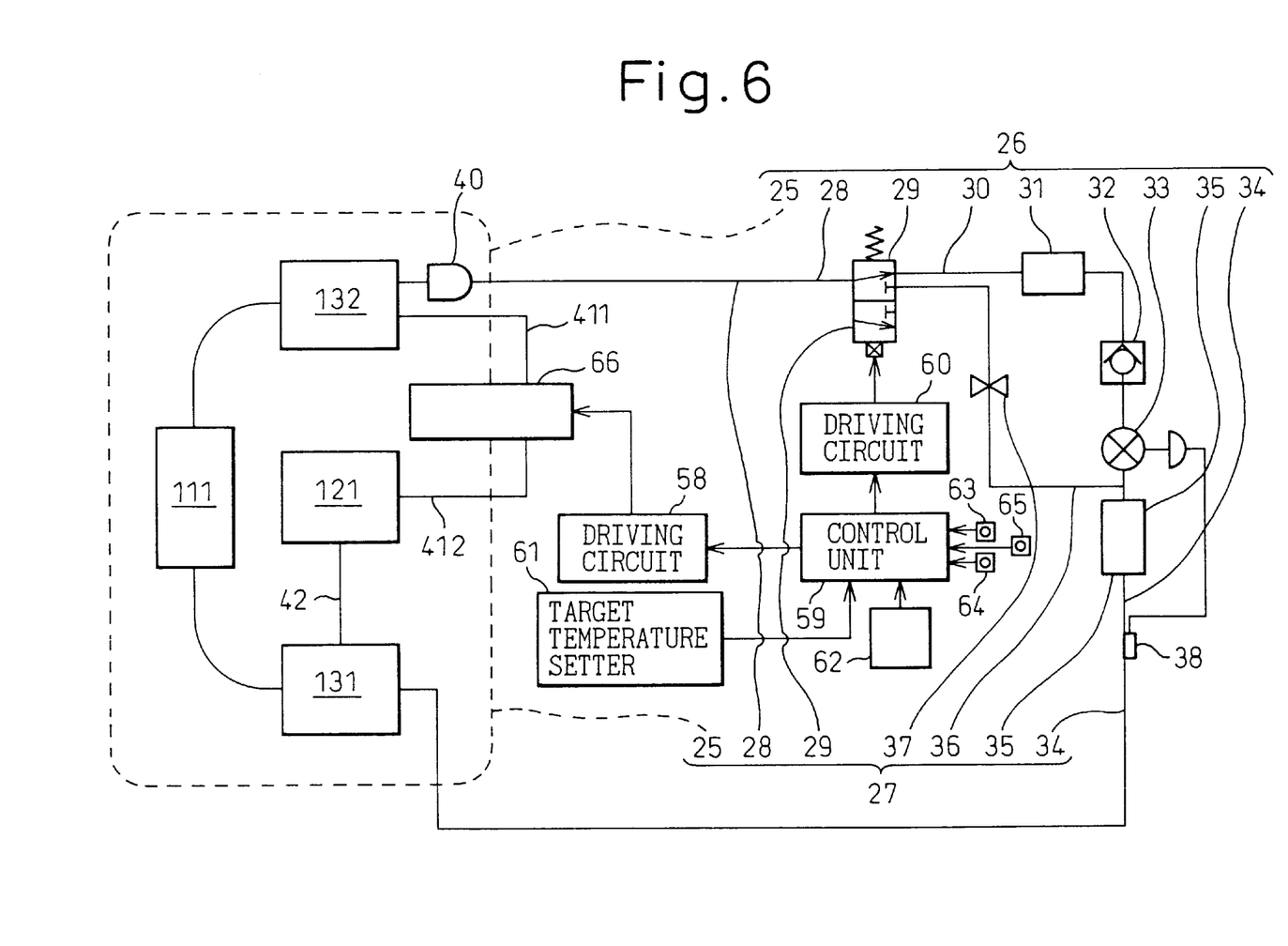
FIG. 6 is a circuit diagram showing a cooling circuit and a heating circuit according to a second embodiment of the invention.
Figure 7:
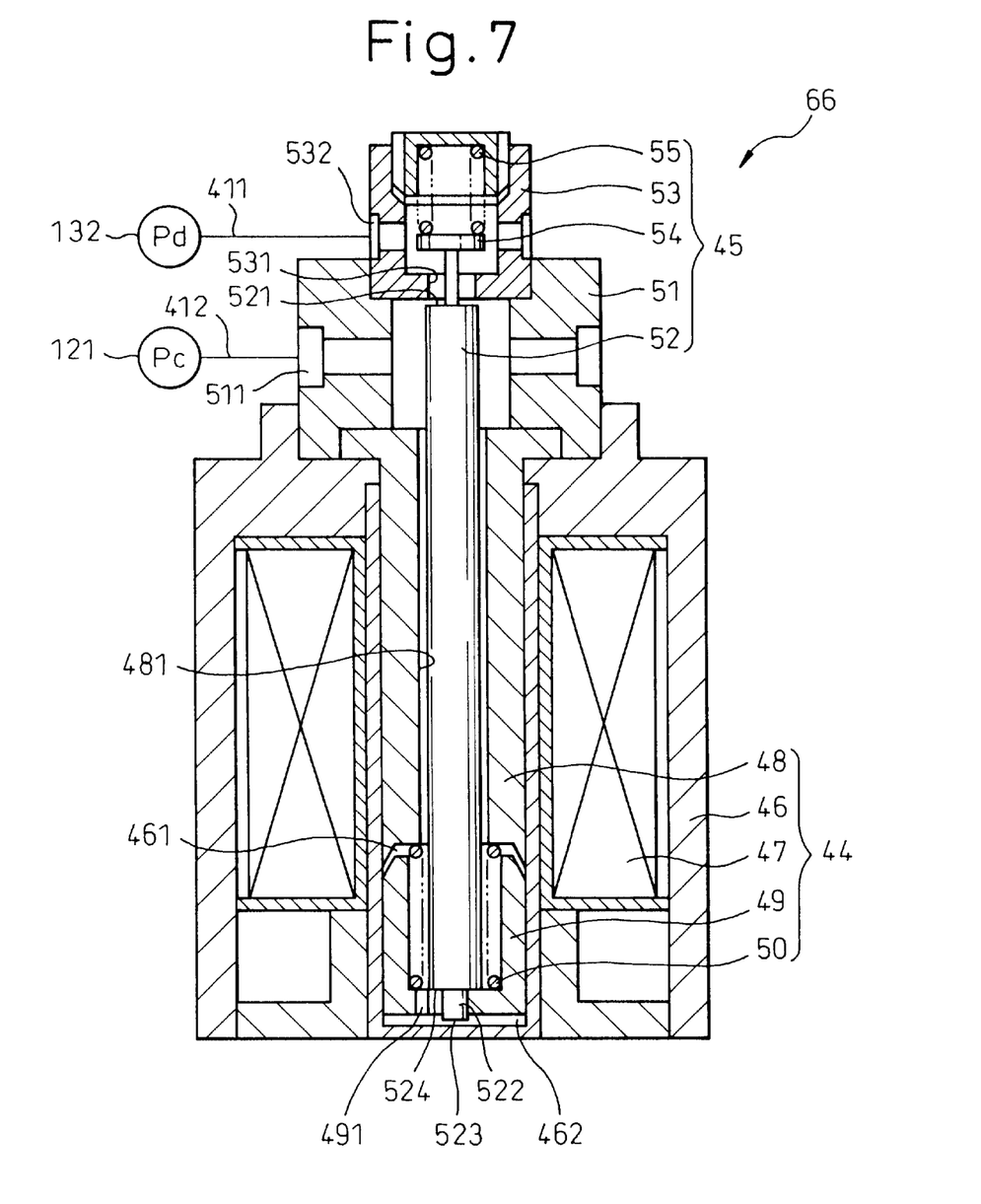
FIG. 7 is a sectional view of a capacity control valve 66.

Now, the second embodiment shown in FIGS. 6 and 7 will be explained. The same component parts as the corresponding parts of the first embodiment are designated by the same reference numerals, respectively.

The variable displacement type compressor 25 according to this embodiment is different from the variable displacement type compressor 25 according to the first embodiment in the lack of the passage 56. In the capacity control valve 66 used for the second embodiment, the lead-out passage 511 communicates with the pressure sensitive chamber 462 through the insertion hole 481 in the cylinder of the fixed iron core 48, the accommodation chamber 461 and the through hole 491. The control pressure Pc in the control pressure chamber 121 is imparted to the pressure sensitive chamber 462, so that the discharge pressure Pd and the control pressure Pc are opposed to each other through the valve body 52. The differential pressure ΔPdc between the discharge pressure Pd and the control pressure Pc obtained by and opposed to each other through the valve body 52 substantially assumes a value given as (area of end surface 521)×(Pd−Pc). The discharge pressure Pd is higher than the control pressure Pc, and therefore the differential pressure ΔPdc urges the valve body 52 in a direction to open the valve hole 531. The electromagnetic force generated by the energization of the coil 47, i.e. the excitation of the solenoid portion 44 is opposed to the force corresponding to the sum of the differential pressure ΔPdc and the spring force of the compression springs 50, 55. The control unit 59 controls the energization and deenergization of the capacity control valve 66 by supplying the coil 47 with a pulse-like driving current based on a controlled duty factor.

The control unit 59 and the capacity control valve 66 make up capacity control means for controlling the discharge capacity based on the differential pressure ΔPdc between the discharge pressure Pd and the control pressure Pc. The solenoid portion 44 makes up means for applying the driving force for defining the differential pressure and applies the driving force to the valve 52 in opposition to the differential pressure ΔPdc.

The inclination angle of the swash plate 20 is controlled based on the differential pressure obtained through the piston 22 between the suction pressure Ps and the control pressure Pc. The difference between the suction pressure Ps and the control pressure Pc is small in value. In other words, there is no great difference between the differential pressure ΔPdc and the differential pressure ΔPds, so that the discharge capacity can be controlled based on the differential pressure ΔPdc in a similar manner to the discharge capacity control based on the differential pressure ΔPds. The control unit 59 executes the cooling and heating control program shown in the flowchart of FIG. 5. Thus, the discharge capacity can be controlled by the capacity control valve 66 responsive to the differential pressure regardless of whether the cooling circuit 26 or the heating circuit 27 is in use. As a result, the same effect is obtained in the second embodiment using the capacity control valve 66 responsive to the differential pressure ΔPdc between the discharge pressure Pd and the control pressure Pc as in the first embodiment.

Figure 8:
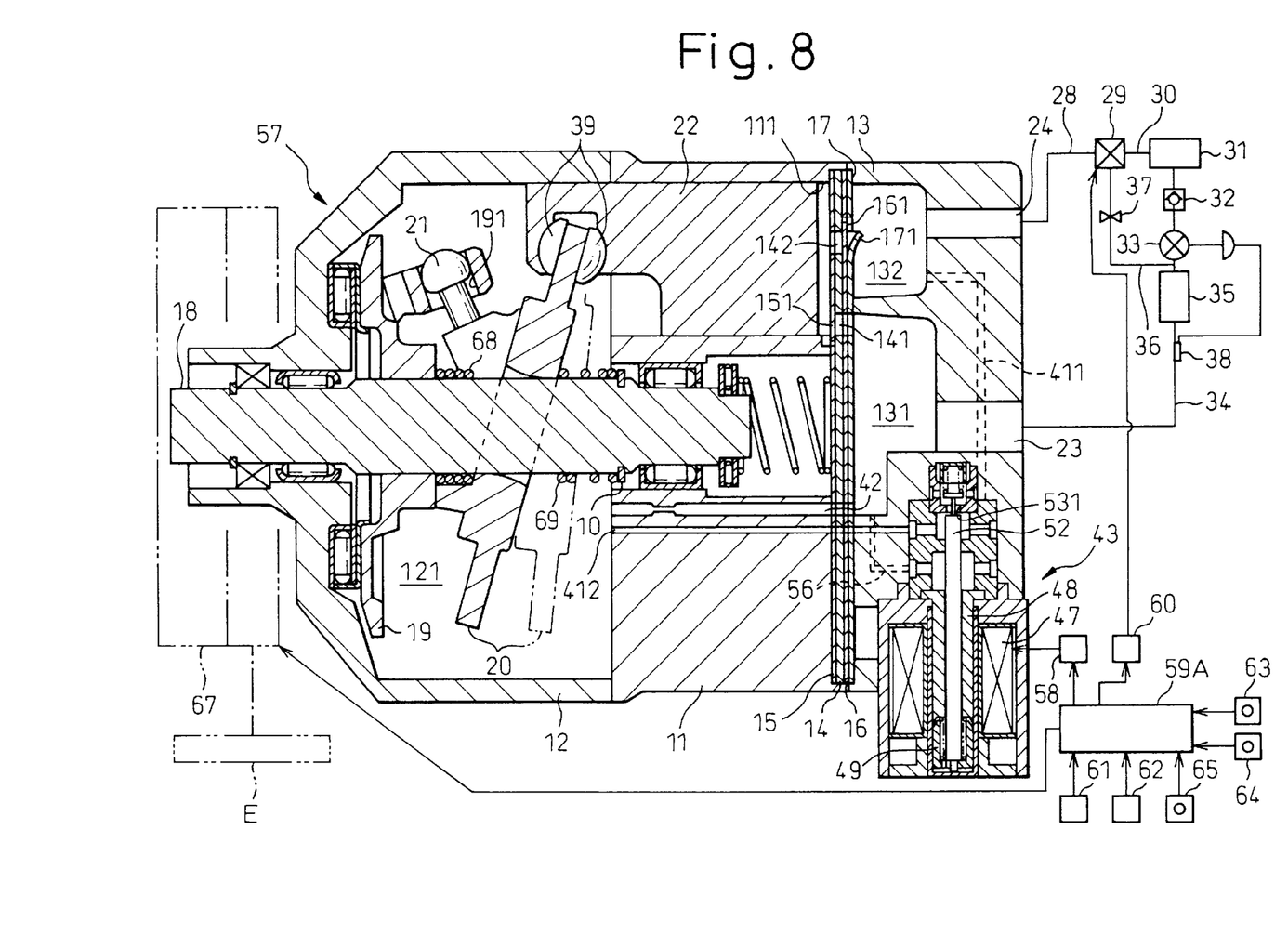
FIG. 8 is a side sectional view of a variable displacement type compressor according to a third embodiment of the invention.

Now, the third embodiment shown in FIG. 8 will be explained. The same component parts as those in the first embodiment are designated by the same reference numerals, respectively.

The variable displacement type compressor 57 according to this embodiment is different from the variable displacement type compressor 25 according to the first embodiment in that the rotary shaft 18 acquires the rotary driving force from the vehicle engine E through the electromagnetic clutch 67 and in that the discharge operation valve 40 is lacking on the discharge passage 24. After setting the switching valve 29 in the first switched state or the second switched state based on the turning on of the cooling command switch 63 or the heating command switch 64, the control unit 59A energizes the electromagnetic clutch 67 to execute the cooling control program or the heating control program, as the case may be, in similar fashion to the first embodiment.

This embodiment produces the same effect as the first embodiment.

The present invention can also be embodied in the following-described ways.

(1) When the heating circuit 27 is in use, the discharge capacity is controlled based on the information defining the differential pressure such as the target temperature To and the detected temperature Tx in the same manner as when the cooling circuit 26 is in use.

(2) The discharge capacity is controlled based on the differential pressure between the discharge pressure Pd at an arbitrary position in the discharge pressure area leading from the discharge chamber 132 to the switching valve 29 and the suction pressure Ps at an arbitrary position in the suction pressure area leading from the evaporator 35 to the suction chamber 131.

(3) The discharge capacity is controlled by controlling the amount of the refrigerant flowing out from the control pressure chamber 121 to the suction pressure area by the capacity control valve responsive to the differential pressure.

It will thus be understood from the foregoing detailed description that according to the present invention, there is provided an air-conditioning system, wherein, regardless of whether the refrigerant is circulated in the cooling circuit or in the heating circuit, the discharge capacity is controlled by capacity control means based on the differential pressure between the pressure in the discharge pressure area and the pressure in the suction pressure area or the differential pressure between the pressure in the discharge pressure area and the control pressure, resulting in a superior advantage that the heating function is performed very effectively in an air-conditioning system which selectively uses one of the cooling circuit and the heating circuit sharing a variable displacement type compressor.

Also, according to the present invention, there is provided an air-conditioning system in which the discharge capacity is controlled downward in the case where the differential pressure between the pressure in the discharge pressure area and the suction pressure area or the differential pressure between the pressure in the discharge pressure area and the control pressure exceeds a preset differential pressure level, thereby leading to a superior advantage that the reduction in the cooling/heating function can be avoided.

While the invention has been described by reference to specific embodiments chosen for purposes of illustration, it should be apparent that numerous modifications could be made thereto by those skilled in the art without departing from the basic concept and scope of the invention.

What is claimed is:

1. An air-conditioning system comprising a variable displacement type compressor for compressing and discharging a refrigerant on the one hand and changing the discharge capacity by changing the control pressure on the other hand, and a cooling circuit and a heating circuit sharing the use of said variable displacement type compressor, one of said cooling circuit and said heating circuit being selectively used, said system further comprising capacity control means for controlling the discharge capacity of said variable displacement type compressor based on selected one of the differential pressure between the pressure in the discharge pressure area and the pressure in the suction pressure area and the differential pressure between the pressure in said discharge pressure area and said control pressure, wherein said discharge capacity is both controlled by said capacity control means regardless of whether the refrigerant is circulated in said cooling circuit or in said heating circuit, and wherein said capacity control means controls said discharge capacity downward in the case where said differential pressure exceeds a preset differential pressure level.

2. An air-conditioning system according to claim 1, wherein said capacity control means includes a capacity control valve responsive to the differential pressure for adjusting the valve opening degree in response to said differential pressure.

3. An air-conditioning system comprising:

a variable displacement type compressor for compressing and discharging a refrigerant on the one hand and changing the discharge capacity by changing the control pressure on the other hand, and a cooling circuit and a heating circuit sharing the use of said variable displacement type compressor, one of said cooling circuit and said heating circuit being selectively used, said variable displacement type compressor including:

a swash plate encased in a control pressure chamber in such a manner as to be rotated integrally with a rotary shaft and having the inclination angle thereof changeable with respect to said rotary shaft;

a plurality of pistons arranged around said rotary shaft and adapted to reciprocate in accordance with the inclination angle of said swash plate;

means for discharging said refrigerant into the discharge chamber from each cylinder bore by the forward movement of each of said pistons;

means for sucking said refrigerant into said cylinder bore from the suction chamber by the backward movement of each of said pistons;

means for supplying the refrigerant to said control pressure chamber through a pressure supply passage from said discharge chamber;

means for controlling the pressure in said control pressure chamber by releasing the refrigerant into said suction chamber through a pressure releasing passage from said control pressure chamber; and controlling the inclination angle of said swash plate by controlling the pressure in said control pressure chamber; and wherein said capacity control means controls selected one of the flow rate of the refrigerant in said pressure supply passage, the flow rate of the refrigerant in said pressure releasing passage and the flow rate of the refrigerant in both said pressure supply passage and said pressure releasing passage;

said system further comprising capacity control means for controlling the discharge capacity of said variable displacement type compressor based on selected one of the differential pressure between the pressure in the discharge pressure area and the pressure in the suction pressure area and the differential pressure between the pressure in said discharge pressure area and said control pressure, wherein said discharge capacity is both controlled by said capacity control means regardless of whether the refrigerant is circulated in said cooling circuit or in said heating circuit.

4. An air-conditioning system according to claim 3, wherein said capacity control means controls said discharge capacity based on said differential pressure.

5. An air-conditioning system comprising a variable displacement type compressor for compressing and discharging a refrigerant on the one hand and changing the discharge capacity by changing the control pressure on the other hand, and a cooling circuit and a heating circuit sharing the use of said variable displacement type compressor, one of said cooling circuit and said heating circuit being selectively used, said system further comprising capacity control means for controlling the discharge capacity of said variable displacement type compressor based on selected one of the differential pressure between the pressure in the discharge pressure area and the pressure in the suction pressure area and the differential pressure between the pressure in said discharge pressure area and said control pressure, wherein said discharge capacity is both controlled by said capacity control means regardless of whether the refrigerant is circulated in said cooling circuit or in said heating circuit, and wherein said capacity control means includes a capacity control valve responsive to the differential pressure for adjusting the valve opening degree in response to said differential pressure, said capacity control valve responsive to the differential pressure includes a valve body subjected to said differential pressure and means for applying a driving force opposed to the differential pressure to said valve body thereby to define the differential pressure.

6. An air-conditioning system according to claim 5, wherein said capacity control means includes means for controlling the driving force of said differential pressure defining driving force application means based on the differential pressure defining information.

* * * * *